US006876533B1

(12) United States Patent
Ryan

(10) Patent No.: US 6,876,533 B1
(45) Date of Patent: Apr. 5, 2005

(54) SURGE SUPPRESSOR ENCLOSURE AND FUSING SYSTEM

(75) Inventor: Barry Ryan, Dalton Gardens, ID (US)

(73) Assignee: A.C. Data Systems of Idaho, Inc., Post Falls, ID (US)

( * ) Notice: Subject to any disclaimer, the term of this patent is extended or adjusted under 35 U.S.C. 154(b) by 207 days.

(21) Appl. No.: 10/187,086

(22) Filed: Jun. 28, 2002

(51) Int. Cl.[7] .................................................. H02H 5/04
(52) U.S. Cl. ...................................................... 361/104
(58) Field of Search ................................ 361/104, 118, 361/124, 125, 56, 117, 111, 103, 57; 316/111; 337/159; 29/623

(56) References Cited

U.S. PATENT DOCUMENTS 3,543,209 A * 11/1970 Kozacka ..................... 337/159
3,825,870 A * 7/1974 Ono et al. .................. 337/159
4,331,947 A * 5/1982 Noerholm ................... 337/159
5,978,198 A * 11/1999 Packard et al. ............. 361/111
6,040,971 A * 3/2000 Martenson et al. ......... 361/118

* cited by examiner

*Primary Examiner*—Stephen W. Jackson
*Assistant Examiner*—Boris Benenson
(74) *Attorney, Agent, or Firm*—Marger Johnson & McCollom, P.C.

(57) ABSTRACT

A surge suppressor includes a surge suppression device. A novel current limiting fuse design prevents current flow when the surge suppression device fails. A thermal fusing device is configured to prevent current flow when excessive heat is generated in the surge suppression device. A novel enclosure is used for containing the surge suppression device, over current fuse and thermal fuse.

The foregoing and other objects, features and advantages of the invention will become more readily apparent from the following detailed description of a preferred embodiment of the invention which proceeds with reference to the accompanying drawings.

25 Claims, 4 Drawing Sheets

SURGE SUPPRESSOR ENCLOSURE AND FUSING SYSTEM

BACKGROUND

Transient Voltage Surge Suppression (TVSS) devices use Metal Oxide Varistors (MOVs). A MOV is connected between an A.C. power line and a neutral line. The MOV becomes conductive during a voltage transient. In the conductive state, the MOV temporarily discharges the voltage transient to the power line. When MOVs fail they can create a short circuit that draws excessive A.C. current from the power line. This excessive current is drawn though the MOV circuit until the fuse in the electrical circuit clears or until a circuit breaker opens. Until the fuse or circuit breaker opens, a large current is conducted through the circuit possibly causing catastrophic results such as extensive smoke, mechanical damage and fire.

A small fuse could be used in the surge suppression system to limit the over current condition and prevent this type of damage. However smaller fuses severely limit the ability of the MOV to temporarily short transient voltage surges.

Multiple MOVs are often connected together in parallel to share transient voltage spikes. The multiple MOVs are typically located in the same enclosure. If a voltage spike or power surge is in excess of the combined energy handling capability of the multiple MOVs, one or more of the fused MOVs blow. Other MOVs and electrical equipment in the enclosure may be damaged by an explosion or fire that happens during the power surge condition. This may prevent some or all of the MOVs in the enclosure from providing protection during subsequent power surges. Further, the MOVs are typically contained inside a plastic enclosure. If the explosion is severe enough, the smoke and explosion from the power surge event may destroy the plastic enclosure and other electrical equipment located next to the enclosure. For example, the electrical surge event may damage electrical equipment in a load center or transfer switch containing the surge suppressor, resulting in large monetary losses.

The present invention addresses this and other problems associated with the prior art.

SUMMARY OF THE INVENTION

A surge suppressor includes a surge suppression device. A novel current limiting fuse design prevents current flow when the surge suppression device fails. A thermal fusing device is configured to prevent current flow when excessive heat is generated in the surge suppression device. A novel enclosure is used for containing the surge suppression device, over current fuse and thermal fuse.

The foregoing and other objects, features and advantages of the invention will become more readily apparent from the following detailed description of a preferred embodiment of the invention which proceeds with reference to the accompanying drawings.

DETAILED DESCRIPTION

Figure 1:
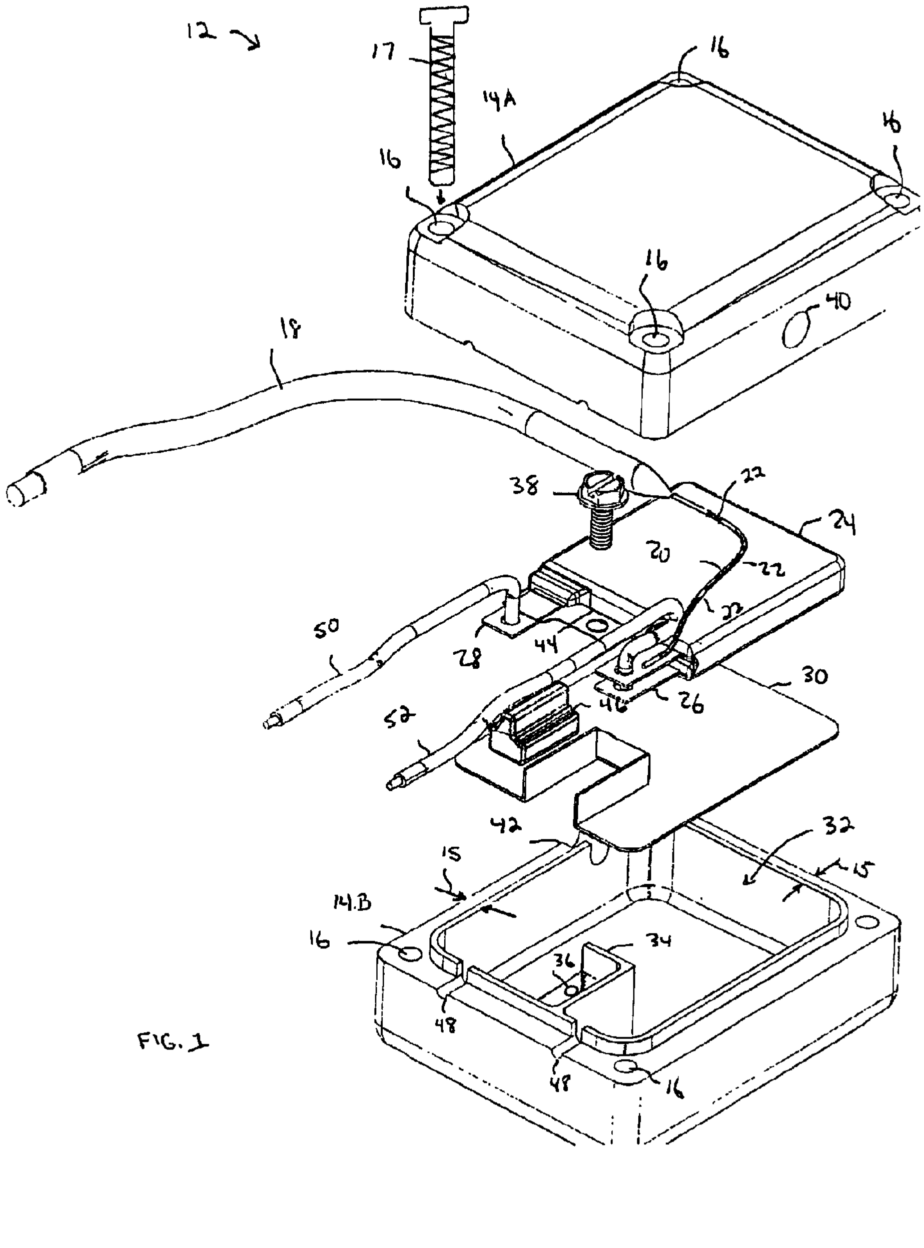
FIG. 1 is an exploded view of a surge suppressor.

FIG. 1 shows a surge suppressor 12 that includes a Metal Oxide Varister (MOV) 24, a current limiting fuse 20, and a thermal fuse 44 all contained inside a metal enclosure 14. The surge suppressor 12 is a module that can be incorporated into other power protection equipment. The MOV 24 in one embodiment is an off the shelf device that is known to those skilled in the art.

The enclosure 14 includes an upper piece 14A and a lower piece 14B. The two enclosure pieces 14A and 14B form an internal cavity 32 that retains the MOV 24. In one example, the enclosure 14 is around 2¾ inches wide, 2¾ inches in height and around 1½ inches in depth. The walls 15 of the enclosure 14 in one example are around one quarter inch thick and are made from aluminum or some other conductive metal material.

Encasing the MOV 24 in metallic enclosure 14 isolates arcing and other destructive events caused by an electrical surge condition of MOV failure. For example, the strength of enclosure 14 isolates explosions, arching and fires inside cavity 32. Because only one, or a few, MOVs 24 are located in the enclosure 14, an explosion inside the enclosure 14 will not damage other surge suppressors or electrical equipment located outside of enclosure 14.

A wire 18 is coupled to a first terminal 26 of the MOV 24 and extends out from the enclosure 14 through a hole 42. Opposite halves of hole 42 are formed in the upper piece 14A and lower piece 14B of enclosure 14. This allows the wire 18 to be laid in the lower half of the hole 42 when the MOV 24 is being installed in cavity 32. When the upper half 14A of the enclosure 14 is seated over the lower half 14B of the enclosure 14, the wire 18 is then snugly encased inside hole 42.

When the surge suppressor 12 is installed, the wire 18 is usually coupled to either a hot power line or a neutral line. In one embodiment, the wire 18 is a #10 Average Wire Gauge (awg). However, in different applications, the wire 18 may be a different awg sizes. For example, the wire 18 could be smaller or larger depending on the voltage and/or current requirements of the surge suppressor 12.

The surge suppressor 12, among other things, reduces the short circuit problems that arise during a MOV failure. This is achieved in one way by providing current limiting fuse 20. The current limiting fuse 20 is coupled between the wire 18 and the terminal 26 of the MOV 24. In one embodiment, the current limiting fuse 20 is a #16 awg wire having a substantially smaller diameter than the wire 18. Other wire sizes can be used for fuse 20 depending on current limiting requirements of the electrical system connected to the surge suppressor 12. For example, a smaller #18 awg wire could be used for quicker over current fusing. In one embodiment the fuse 20 is copper with a tin outside coating. Of course other types of conductive materials could also be used for fuse 20.

Figure 5:
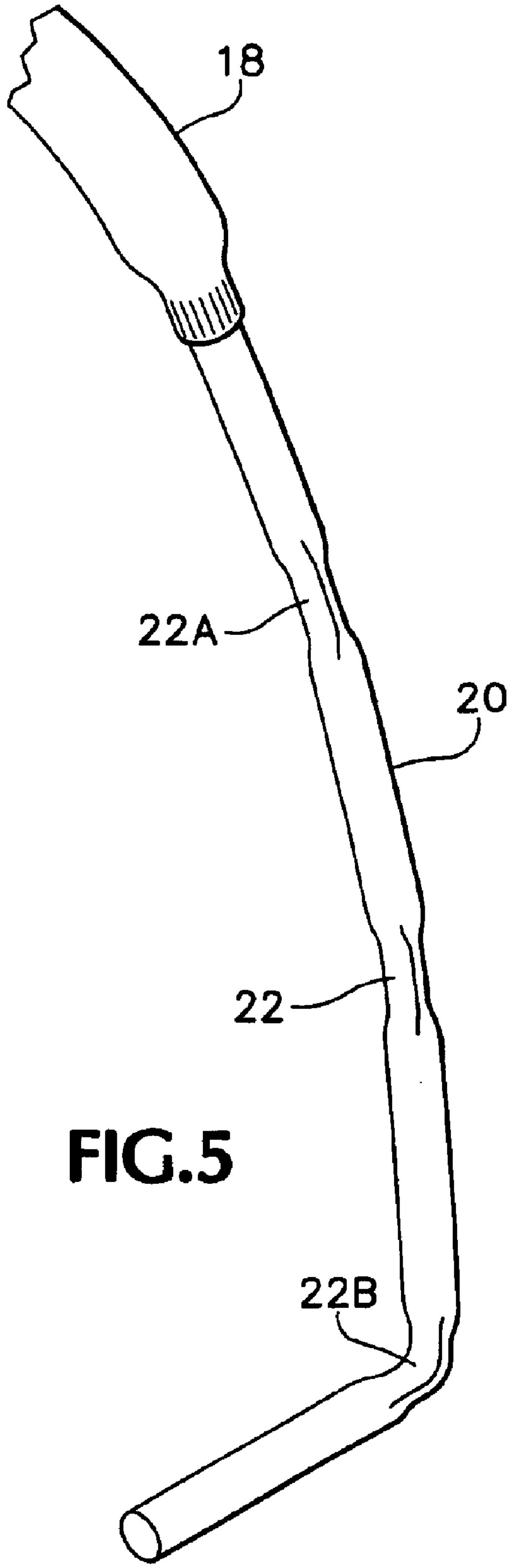
FIG. 5 is an isolated view of an over current fuse used in the surge suppressor shown in FIG. 1.

The current limiting fuse 20 is shown in more detail in FIG. 5 and includes optional crimps 22. The crimps 22 have a reduced diameter (thinner cross-sectional shape), than the general round circumference of the fuse wire 20. The flatten shape of crimps 22 concentrate current density and promote arcing. Arcs could be generated at multiple crimps 22 at the same time. This speeds of the process of the arcs opening up portions of fuse 20 enhancing the current limiting ability of fuse 20. In one embodiment the crimps 22 are located about % inch apart and there may be two or three crimps for around a two inch long fuse 20.

Alternatively, if space permits a commercially available fuse could also be used in place of the current limiting fuse 20. For example, any commercially available off-the-shelf fuse with the required current fusing properties could be used.

Referring back to FIG. 1, a second terminal 28 of MOV 24 is coupled to a divider portion 34 of the enclosure 14 through a thermal fuse 44. The thermal fuse 44 is shown in further detail in FIG. 4 and in one embodiment is made from a piece of spring steel. One end of thermal fuse 44 is coupled by solder 74 to terminal 28 of the MOV 24. The opposite end of thermal fuse 44 is attached with a screw 38 to divider 34. The screw 38 is threadingly engaged with a hole 36 in the divider 34.

Divider 34 is formed in the lower piece 14B of the enclosure 14 and creates an elevation between the two ends of thermal fuse 44. The thermal fuse 44 is springingly bent from the divider 34 down to the MOV terminal 28.

The temperature of the terminal 28 will increase during abnormally high voltage conditions. This causes the solder 74 to melt allowing the thermal fuse 44 to free itself from, terminal 28. A spring effect moves the thermal fuse 44 from position 70 to position 72 in FIG. 4. This opens the circuit preventing current from flowing from the MOV 24 to enclosure 14. Referring back to FIG. 1, a paper sheet 30 is located inside the bottom of cavity 32 underneath the MOV 24. The sheet 30 can be any fibrous material such as paper or cloth that provides an insulating and condensation absorbing layer between the MOV 24 and the enclosure 14. A heat shrink 46 is slid over the terminal 26 and a portion of wire 52 for insulating purposes.

Two wires 50 and 52 are coupled to terminals 28 and 26 of MOV 24 respectively. The wires are coupled to a monitoring circuit 60 shown in FIG. 3. The monitoring circuit 60 measures the voltage across the terminals 28 and 26 to determine the operational status of MOV 24.

A large voltage across terminals 28 and 26 indicates the MOV 24 is not conducting current and is operational. Little or no voltage across the terminals 28 and 26 may indicate the MOV 24 has shorted and thus nonoperational. Alternatively, either one of the fuses 20 or 44 may blow. This would also reduce the voltage across the terminals 26 and 28.

The monitoring circuit 60 upon detecting any of these low voltage conditions across the MOV 24 generates an annunciation signal that notifies an operator of the failure condition. This allows an operator to identify and replace the failed surge suppressor 12.

A hole 40 on the side of enclosure 14 is used for inserting sand into cavity 32 after the enclosure 14 has been bolted together. A rivet (not shown) is then inserted into hole 40 to prevent the sand from escaping.

The enclosure 14 includes screw holes 16. Screws 17 are threadingly engaged in the holes 16. One or more of the screws 17 may have an extended length for extending through both the holes 16 in the upper enclosure piece 14A and the lower enclosure piece 14B and then threadingly engaging with a hole in a bus bar (not shown). Other screws may only be long enough to hold the upper piece 14A and lower piece 14B together.

Figure 2:
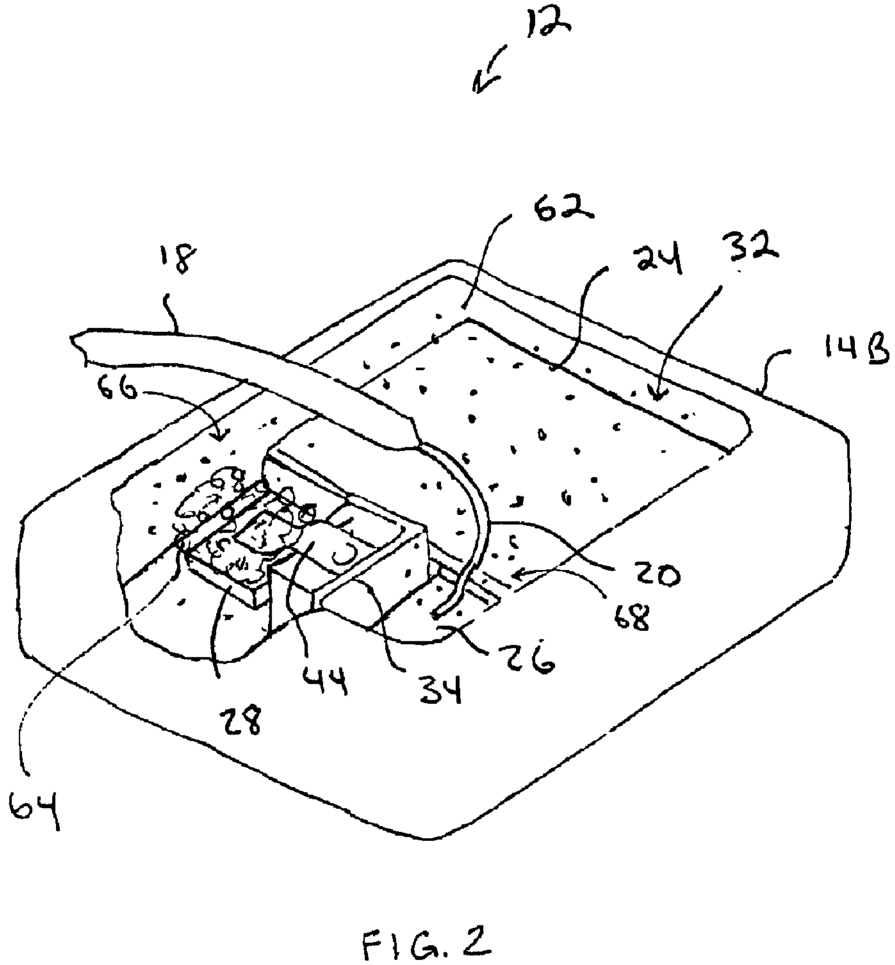
FIG. 2 is a partial cutaway view of the surge suppressor shown in FIG. 1.

FIG. 2 shows the MOV 24 inserted inside the cavity 32 of enclosure 14. The thermal fuse 44 is shown coupled between the MOV terminal 28 and the divider section 34. A first portion 66 of cavity 32 contains the terminal 28 and thermal fuse 44. A second portion 68 of cavity 32 contains MOV terminal 26 and a portion of current limiting fuse 20.

In one embodiment, cavity portion 66 is filled with a paraffin wax material 64. The divider 34 in one instance operates as a dyke to retain wax 64 within cavity section 66 when the liquid wax is initially poured over thermal fuse 44. The other portions of cavity 32 are encased with sand 62. The sand 62 more quickly extinguishes arcing across sections of current limiting fuse 20 that are opened during over current conditions.

Figure 3:
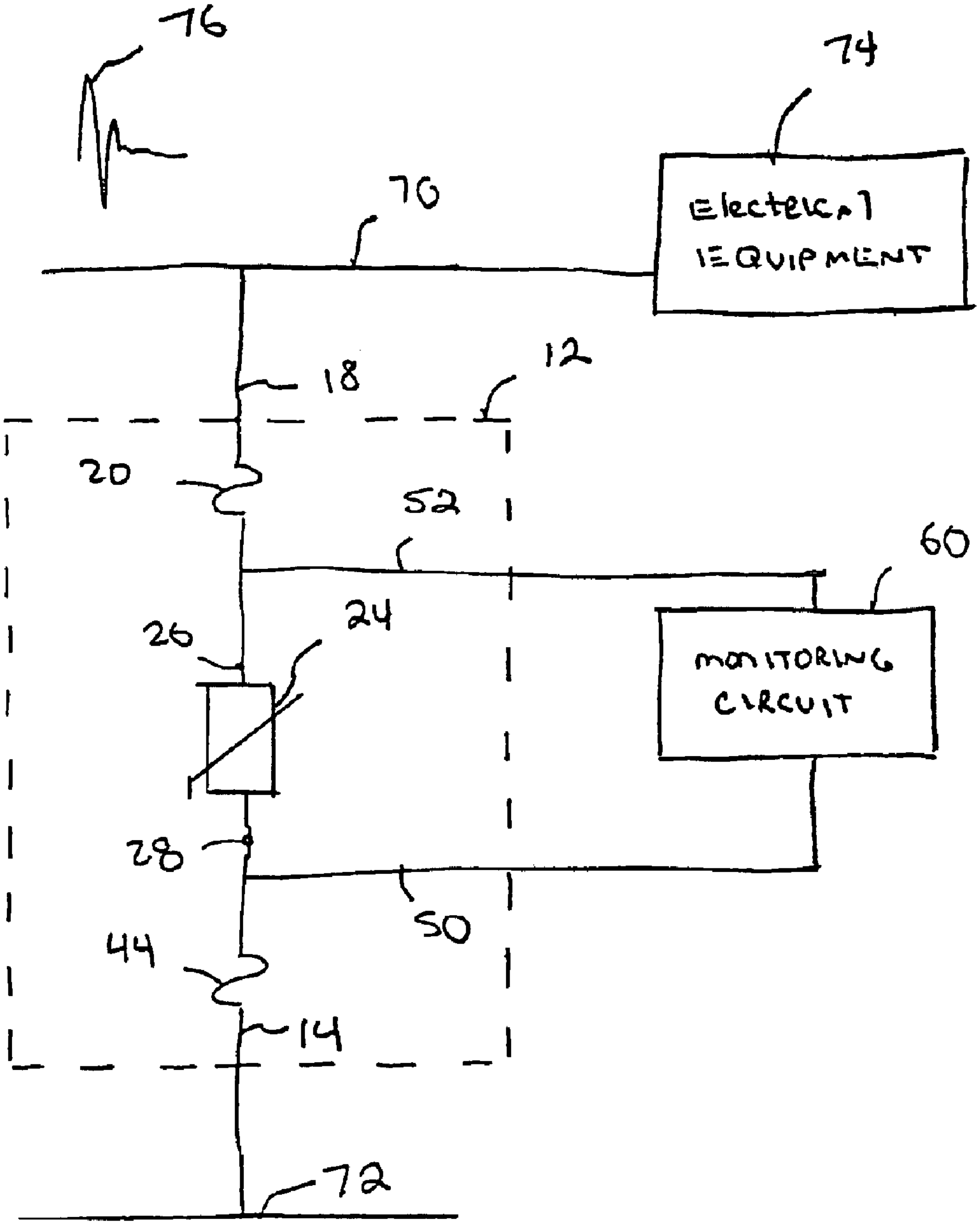
FIG. 3 is a circuit diagram for the surge suppressor shown in FIG. 1.

FIG. 3 shows an electrical diagram of the surge suppressor 12. The wire 18 couples a first end of the current limiting fuse 20 to a power line 70. A second end of the current limiting fuse 20 is coupled to terminal 26 of MOV 24. The second terminal 28 of MOV 24 is coupled through thermal fuse 44 to a neutral wire or bus bar 72. In the embodiment shown in FIG. 1, the thermal fuse 44 is coupled to enclosure 14 and the enclosure 14 is then electrically and mechanically connected to the power (line or neutral) connection 72. The monitoring circuit 60 is coupled across MOV terminals 26 and 28 by wires 52 and 50, respectively.

In an alternative embodiment, wire 18 is coupled to the neutral connection 72 and the enclosure 14 is connected to the power line 70.

Referring to FIGS. 1–5, an energy transient 76 may occur on power line 70. For example, lighting may strike power line 70. Under normal operating conditions, the transient 76 is directed from the power line 18, through the MOV 24 and enclosure 14 to the neutral connection 72. This redirects the transient 76 away from any electrical equipment 74.

The MOV 24 may fail due to "old age," excessive transient current or abnormally high AC voltage. In the failed condition, the MOV 24 may essentially become a short circuit. This allows current from power line 70 to go directly to neutral 72. The current limiting fuse 20 opens in this short circuit condition at one or more of the crimps 22. This prevents damage to any equipment outside the enclosure 14.

Under certain situations the suppressor 12 may be subjected to high AC voltage with limited current. This may happen for instance when an electrical system loses the neutral connection 72 and causes power line 70 to have more voltage than normal. This higher voltage condition can cause the MOV 24 to draw some current, and if the voltage is high enough, the MOV 24 may fail.

Figure 4:
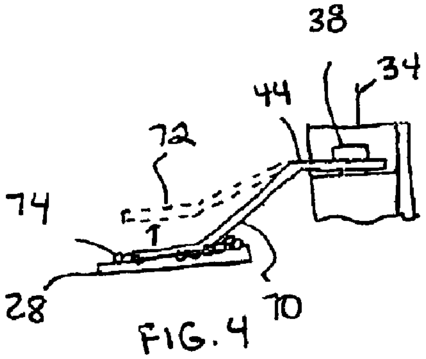
FIG. 4 is a isolated view of a thermal fuse used in the surge suppressor shown in FIG. 1.

While current is flowing, the MOV 24 will heat. The heat travels down terminal 28 on the MOV 24 to the thermal fuse 44. If the temperature is high enough, the solder 74 (FIG. 4) connecting the thermal fuse 44 to terminal 28 melts. This allows the thermal fuse 44 to spring up as shown in FIG. 4 breaking the connection between MOV 24 and enclosure 14. This opens the connection between power line and neutral 72.

The thermal fuse 44 is encased in wax 64 (FIG. 2). The wax 64 will be liquid when the solder 74 melts. The liquefied wax allows the fuse 44 to freely spring up to position 72 (FIG. 4) during a high temperature condition. The wax 64 in the solidified state prevents sand 62 from packing too tightly around the thermal fuse 44 and restricting the fuse 44 from freely springing upwards from contact 28 when the solder 74 melts.

The wax 64 could be any kind as long as it liquefies when the solder 74 melts. The melting point of the solder 74 can be varied according to the electrical requirements of surge suppressor 12. This is done by using different alloy ratios in solder 74. For example, different ratios of materials such as tin, lead, bismuth, indium, etc. can be used to vary the melting point of solder 74.

The enclosure 14 in one embodiment is a conductive metallic material such as aluminum. However, any material can be used that is strong enough to contain the explosive energy that may exist during a power surge. For example, the enclosure 12 could be a non-metallic material, such as plastic. If a non-conductive material is used, in addition to wire 18, a second wire would be extended out of the enclosure 14 from the end of thermal fuse 44 to the neutral connection 72. The enclosure 14 can be any size necessary to contain the MOV 24 and the fuses 20 and 44.

Having described and illustrated the principles of the invention in a preferred embodiment thereof, it should be apparent that the invention may be modified in arrangement and detail without departing from such principles. I claim all modifications and variation coming within the spirit and scope of the following claims.

What is claimed is:

1. A surge suppressor, comprising:
- a surge suppression device;
- a current limiting fuse configured to disconnect the surge suppression device during an over current condition; and
- a thermal fuse configured to disconnect the surge suppression device during a over heating condition; and
- an explosion resilient enclosure individually containing the surge suppression device, the current limiting fuse and the thermal fuse for preventing explosions from power surges from escaping outside the enclosure.

2. A surge suppressor according to claim 1 wherein the current limiting fuse is coupled between a power line and a first terminal of the surge suppression device and the thermal fuse is coupled between a second terminal of the surge suppression device and a neutral line.

3. A surge suppressor according to claim 1 wherein the current limiting fuse comprises a wire having a circular cross-sectional shape.

4. A surge suppressor according to claim 3 wherein the wire includes one or more crimps that flatten the cross-sectional shape for promoting fusing during high current conditions.

5. A surge suppressor according to claim 1 wherein the thermal fuse comprises a piece of metal soldered at a first end to a first terminal of the surge suppression device in a bent spring position and coupled at a second end to the enclosure electrically coupling the first terminal through the piece of metal to the enclosure, the fuse springingly detaching from the surge suppression device when heat from the surge suppression device melts the solder.

6. A surge suppressor according to claim 1 including a metal enclosure individually encasing only the surge suppression device, the current fuse and the thermal fuse isolating effects of power surge conditions in the surge suppression device from escaping outside the enclosure and damaging any neighboring surge suppression devices.

7. A surge suppressor according to claim 6 including arc suppression material packed inside the enclosure.

8. A surge suppressor according to claim 7 wherein the arc suppression material comprises a granular non flammable material.

9. A surge suppressor, comprising:
- a surge suppression device;
- a current limiting fuse configured to disconnect the surge suppression device during an over current condition;
- a thermal fuse configured to disconnect the surge suppression device during an over heating condition, wherein the thermal fuse comprises a piece of metal soldered to the surge suppression device in a bent spring position, the fuse springingly detaching from the surge suppression device when heat from the surge suppression device melts the solder; and
- a substance that will liquefy at less than the solder temperature encased around the thermal fuse.

10. A surge suppressor, comprising:
- a surge suppression device;
- a current limiting fuse configured to disconnect the surge suppression device during an over current condition;
- a thermal fuse configured to disconnect the surge suppression device during an over heating condition; and
- a metal enclosure containing the surge suppression device, the current fuse and the thermal fuse, wherein the enclosure is a conductive metal that operates as one terminal of the surge suppression device.

11. A surge suppressor, comprising:
- a surge suppression device;
- a current limiting fuse configured to disconnect the surge suppression device during an over current condition;
- a thermal fuse configured to disconnect the surge suppression device during an over heating condition; and
- a metal enclosure containing the surge suppression device, the current fuse and the thermal fuse, wherein the enclosure includes a divider for electrically coupling to one end of the thermal fuse.

12. A surge suppressor, comprising:
- one or a few surge suppression devices; and
- a metal enclosure individually encasing only the one or few surge suppression devices for preventing effects of power surge conditions in the surge suppression device from escaping outside the enclosure and affecting any neighboring electrical equipment or neighboring surge suppression devices.

13. A surge suppressor according to claim 12 wherein the enclosure has metal sides that are approximately one quarter inch thick.

14. A surge suppressor according to claim 12 wherein the enclosure has metal sides that are at least one quarter inch thick.

15. A surge suppressor according to claim 14 wherein the fusing circuitry includes a round diameter wire operating as a current limiting fuse.

16. A surge suppressor according to claim 12 wherein the fusing circuitry includes a thermal fuse electrically and mechanically coupled between the surge suppression device and the enclosure that opens according to a melting point of solder holding the thermal fuse to the surge suppression device.

17. A surge suppressor, comprising:
- a surge suppression device; and
- a metal enclosure individually encasing the surge suppression device for preventing effects of power surge conditions in the surge suppression device from escaping outside the enclosure, wherein the enclosure is a conductive metal material operating as one terminal of the surge suppression device.

18. A surge suppressor, comprising:
- a surge suppression device;
- a metal enclosure individually encasing the surge suppression device for preventing effects of power surge conditions in the surge suppression device from escaping outside the enclosure, wherein the enclosure has metal sides that are approximately one quarter inch thick;

fusing circuitry contained inside the enclosure for preventing current flow when the surge suppression device has failed, wherein the fusing circuitry includes a round diameter wire operating as a current limiting fuse and the wire includes flattened areas for promoting arcing during an over current condition.

19. A surge suppressor, comprising:

a surge suppression device;

a metal enclosure individually encasing the surge suppression device for preventing effects of power surge conditions in the surge suppression device from escaping outside the enclosure; and a wax material encasing a thermal fuse in the enclosure and a granular material packed inside the enclosure for suppressing electrical arcs.

20. A surge suppressor, comprising:

a surge suppression device;

a metal enclosure individually encasing the surge suppression device for preventing effects of power surge conditions in the surge suppression device from escaping outside the enclosure; and a divider in the enclosure extending between a first terminal and second terminal of the surge suppression device.

21. A fuse, comprising:

a wire having a circular cross-sectional shape; and one or more crimps in the wire that flatten the cross-sectional shape and serve to promote fusing during over current conditions.

22. A fuse according to claim 21 wherein the wire is a #16 average wire gage.

23. A fuse according to claim 21 wherein the crimps are each spaced about 12 inches apart.

24. A fuse according to claim 21 wherein the wire is coupled to a first terminal of a surge suppression device for disconnecting a power line from the surge suppression device during the over current condition.

25. A fuse according to claim 24 including a metal enclosure isolating the fuse and the surge suppression device from other electrical equipment and surge suppression devices.

* * * * *

UNITED STATES PATENT AND TRADEMARK OFFICE

CERTIFICATE OF CORRECTION

PATENT NO. : 6,876,533 B1
DATED : April 5, 2005
INVENTOR(S) : Ryan

It is certified that error appears in the above-identified patent and that said Letters Patent is hereby corrected as shown below:

Column 2,
Line 16, replace “2¾ inches in height” with -- 2¼ inches in height --.

Column 3,
Line 1, replace “% inch apart” with -- ½ inch apart --.
Line 24, replace “free itself from,” with -- free itself from --.

Column 8,
Line 12, replace “about 12 inches apart” with -- about ½ inches apart --.

Signed and Sealed this

Thirtieth Day of May, 2006

JON W. DUDAS
*Director of the United States Patent and Trademark Office*